(12) United States Patent
Sakai et al.

(10) Patent No.: US 7,613,550 B2
(45) Date of Patent: Nov. 3, 2009

(54) OCCUPANT CLASSIFYING DEVICE FOR VEHICLE

(75) Inventors: Morio Sakai, Toyota (JP); Masaki Mori, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 923 days.

(21) Appl. No.: 11/165,486

(22) Filed: Jun. 24, 2005

(65) Prior Publication Data

US 2005/0288829 A1 Dec. 29, 2005

(30) Foreign Application Priority Data

Jun. 24, 2004 (JP) ............................. 2004-186430

(51) Int. Cl.
*B60R 22/00* (2006.01)
(52) U.S. Cl. .......................................... 701/1; 280/268
(58) Field of Classification Search .................... 701/1, 701/45, 46, 48, 49, 29–31, 35, 37–39, 41, 701/43, 34; 280/728.1, 730.1, 734, 735, 280/801.1; 180/268, 274, 282; 340/438
See application file for complete search history.

(56) References Cited

U.S. PATENT DOCUMENTS

| | | | | |
|---|---|---|---|---|
| 5,835,873 A | * | 11/1998 | Darby et al. | ............. 701/45 |
| 5,867,536 A | * | 2/1999 | Lyons et al. | ............. 375/295 |
| 5,899,949 A | | 5/1999 | Kincaid | |
| 5,954,775 A | | 9/1999 | Cluff | |
| 6,295,494 B1 | | 9/2001 | Nitschke et al. | |
| 2003/0076221 A1 | * | 4/2003 | Akiyama et al. | ....... 340/310.01 |
| 2004/0068357 A1 | * | 4/2004 | Kiribayashi | ............. 701/45 |

FOREIGN PATENT DOCUMENTS

| | | |
|---|---|---|
| DE | 41 26 449 A1 | 2/1992 |
| EP | 0 327 456 A1 | 9/1989 |
| WO | 03/084112 A2 | 10/2003 |

OTHER PUBLICATIONS

European Search Report for European Application No. 05 01 3379, dated Oct. 19, 2005.

* cited by examiner

*Primary Examiner*—Dalena Tran
(74) *Attorney, Agent, or Firm*—Buchanan Ingersoll & Rooney PC (57) ABSTRACT

An occupant classifying device for a vehicle includes a load detection device for detecting a load applied on a vehicle seat, a control device for judging classification of an occupant on the basis of load data inputted from the load detection device, and a communication control portion provided on the control device, the communication control portion for controlling bilateral communication conducted between the load detection device and the control device. The bilateral communication is conducted at different communication speeds on the basis of a communication state of the bilateral communication or an operational state of the control device.

13 Claims, 8 Drawing Sheets

OCCUPANT CLASSIFYING DEVICE FOR VEHICLE

CROSS REFERENCE TO RELATED APPLICATIONS

This application is based on and claims priority under 35 U.S.C. §119 with respect to Japanese Patent Application No. 2004-186430 filed on Jun. 24, 2004, the entire content of which is incorporated herein by reference.

FIELD OF THE INVENTION

The present invention relates to an occupant classifying device for a vehicle. More particularly, the present invention pertains to an occupant classifying device which detects load applied on a vehicle seat, and an occupant occupying a vehicle seat on the basis of the detected load data.

BACKGROUND

A known occupant detection device detecting an occupant occupying a vehicle seat and transmitting the classification of the occupant to the occupant detection device is described in US2004/0068357A1. With the construction according to the occupant detection device described in US2004/0068357A1 load sensor is reduced in size, and manufacturing cost is reduced by appropriately aggregates each function of the vehicle occupant detection device.

More particularly, the occupant detection device described in US2004/0068357A1 includes a load sensor for outputting load data applied on a vehicle seat, and a control device having a calculation portion for classifying an occupant on the basis of an output from the load sensor. The load sensor is configured to output the load data as analogue voltage, and the control device includes an analogue-digital converting portion for converting analogue voltage to digital data. The control device transmits judgment result encoded at the calculation portion to the vehicle occupant protection device. Thus, the load sensor which does not include the analogue-digital conversion function can be reduced in size and simpler. Further, because the judgment result is encoded, signal error of the data transmitted to the vehicle occupant protection device can be easily detected, and thus reliability of the transmitted data can be improved.

Notwithstanding, generally, plural load sensors, particularly, 3-4 load sensors are provided on each vehicle seat. Thus, the control device requires analogue-digital converters (i.e., A/D converter) corresponding to the number of load sensors. Although the multiple load sensors may be provided on a single vehicle seat using a single A/D converter via an analogue multiplexer, or the like, necessity of the analogue multiplexer and circuits, or the like, for controlling thereof increases the circuit of the control device in size. There are large number of sources of noise such as audio equipment, an indoor unit of ETC (i.e., an electronic toll collection system), and a navigation system, for vehicles recently. Thus, when transmitting the load data as analogue signal to the control device, the possibility that the noise is overlapped on the analogue signal is highly increased, which is not favorable for detecting an occupant sitting on the vehicle seat.

Further, the vehicle occupant protection device for transmitting digitalized and encoded signal can be constructed to detect that the signal was not enable to be transmitted properly because of signal error, or the like. However, with the vehicle occupant protection device, for example, an airbag device, or, a seatbelt device, it is not favorable that the detection data of the occupant cannot be obtained when the vehicle occupant protection device has to conduct important control such as at vehicle collision even if improper transmission of the signal can be detected.

A need thus exists for an occupant classification device for a vehicle which accurately transmits load data by improving noise-proof.

SUMMARY OF THE INVENTION

In light of the foregoing, the present invention provides an occupant classifying device for a vehicle, which includes a load detection device for detecting a load applied on a vehicle seat, a control device for judging classification of an occupant on the basis of load data inputted from the load detection device, and a communication control portion provided on the control device, the communication control portion for controlling bilateral communication conducted between the load detection device and the control device. The bilateral communication is conducted at different communication speeds on the basis of a communication state of the bilateral communication or an operational state of the control device.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

One embodiment of the present invention will be explained with reference to illustrations of drawing figure as follows.

Figure 1:
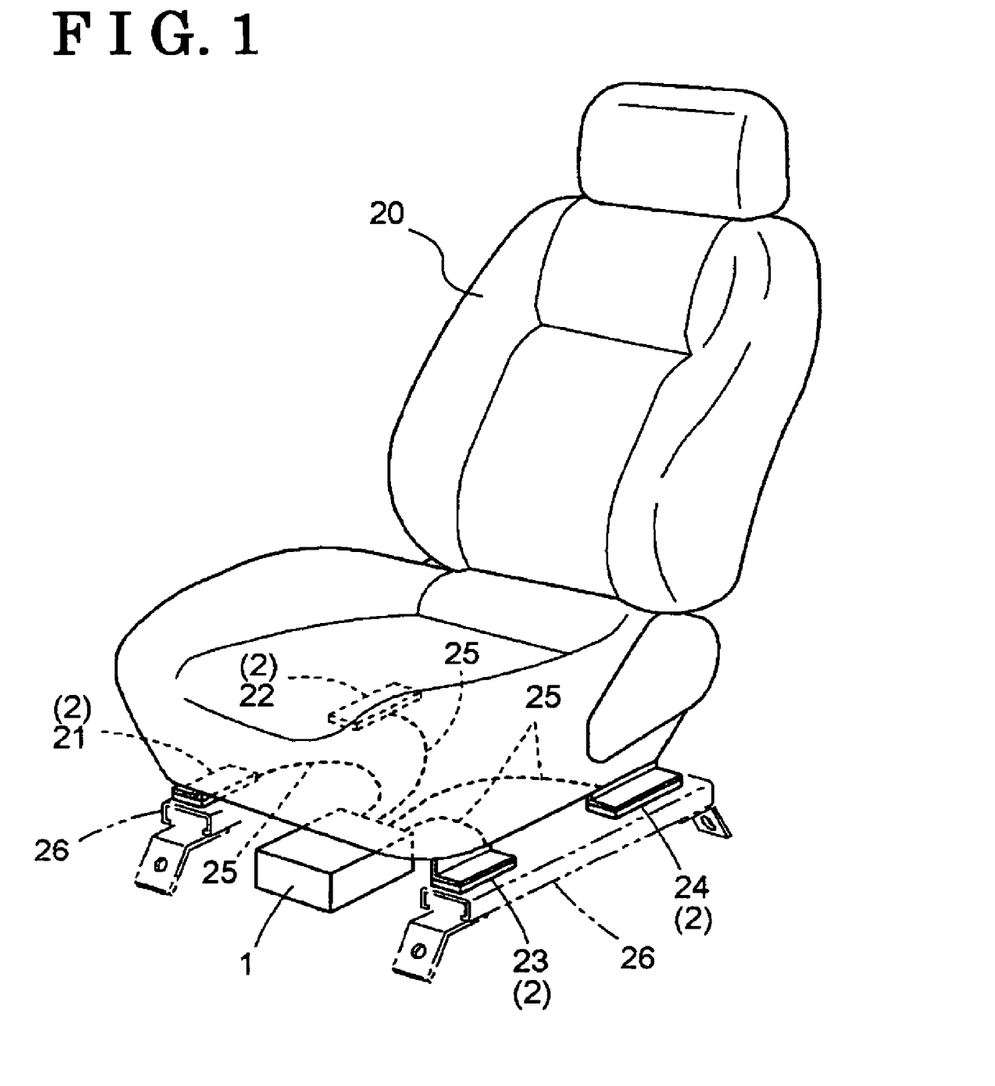
FIG. 1 is a pattern diagrams showing an arrangement of each portion of an occupant-classifying device for a vehicle according to an embodiment of the present invention.

As shown in FIG. 1, an occupant classifying device for a vehicle according to the embodiment of the present invention includes sensors 2 serving as a load detection device under a bottom portion of a vehicle seat 20 for measuring load applied on the vehicle seat 2 by an occupant occupying the vehicle seat 20. The sensors 2 (i.e., sensors 21-24) are provided on seat rails 26 of the vehicle seat 20 at four positions including front right position, front left portion, rear right portion, and rear left portion. The sensors 21-24 are connected to an ECU (electronic control unit) 1 serving as a control device via a transmission line 25.

Figure 2:
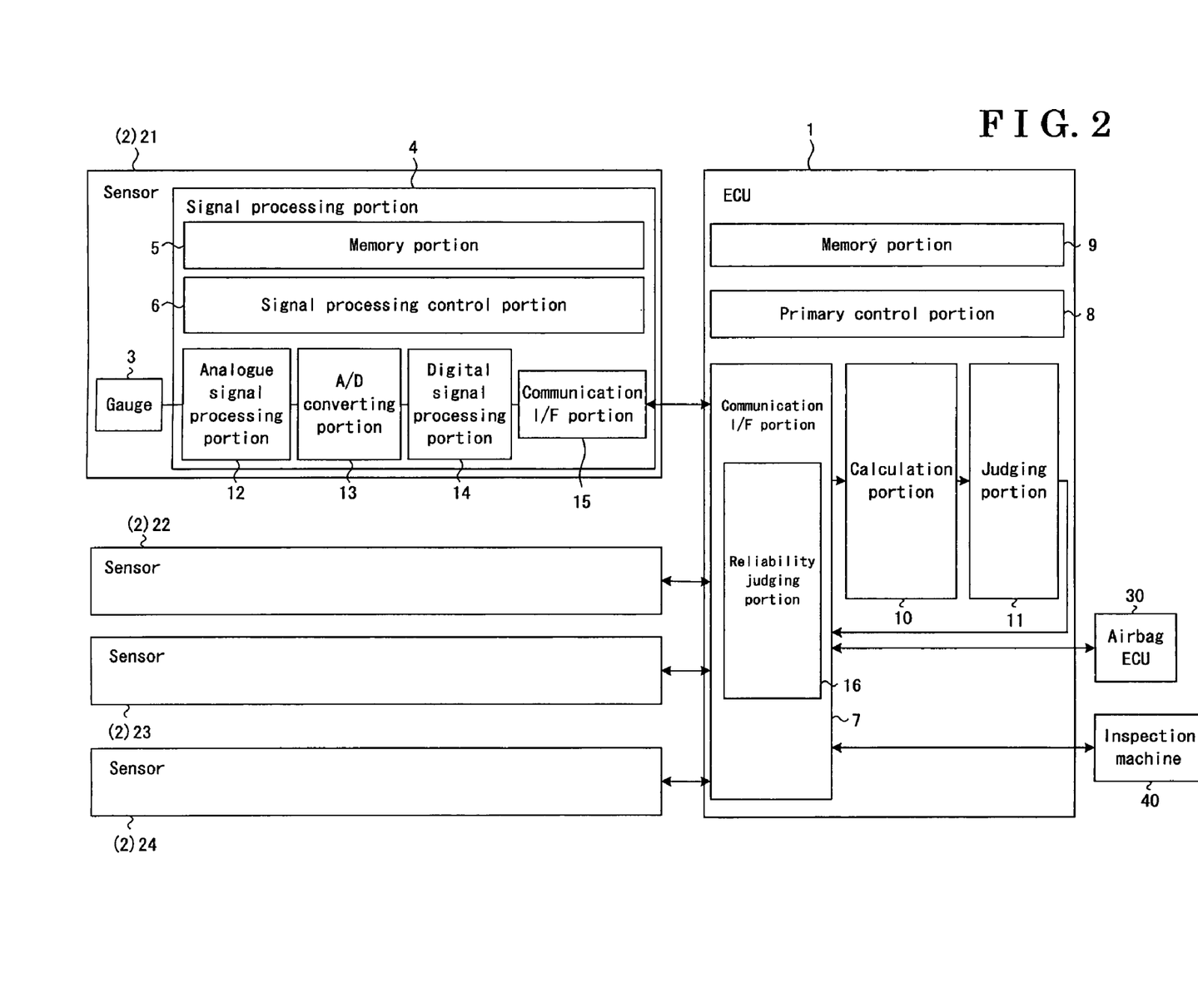
FIG. 2 is a block view illustrating a system of the occupant-classifying device for the vehicle according to the embodiment of the present invention.

According to the embodiment of the present invention, the sensor 2 is constructed using strain gauge. As shown in FIG. 2, the sensor 2 includes a gauge 3 serving as a measuring portion, and a signal processing portion 4. The signal processing portion 4 includes an analogue signal processing portion 12, an analogue-digital converting portion (i.e., hereinafter refereed as A/D converting portion) 13, a digital signal processing portion 14, a communication interface portion (i.e., hereinafter refereed as communication I/F portion) 15, a signal processing control portion 6 for controlling the analogue signal processing portion 12, the A/D converting portion 13, the digital signal processing portion 14, and the communication I/F portion 15, and a memory portion 5 for memorizing data and information necessary for a transaction in the signal processing portion 4.

Flow of signal from the sensor 2 will be explained as follows. The gauge 3 outputs gauge voltage being proportional to level of strain generated by weight applied on the vehicle seat 20 (i.e., gauge output voltage). The analogue signal processing portion 12 including an amplifier, or the like, amplifies the inputted gauge output voltage. The amplified signal is converted into a digital signal at the A/D converting portion 13. The signal converted into the digital signal is applied with digital signal processing such as correcting signal and arranging format so as to match to communication specifications as necessity arises at the digital signal processing portion 14. Thereafter, the signal is applied with signal processing such as adding a code for judging communication error at the communication I/F portion 15 to be outputted to the ECU 1. Because the sensor 2 and the ECU 1 have bilateral communication, the communication I/F portion 15 also has a role to receiving the communication signal inputted from the ECU 1 to transmit to the signal processing control portion 6. Communication speed of the bilateral communication between the ECU 1 and the sensor 2 can be programmed to change.

The signal processing control portion 6 controls each portion of the signal processing portion 4. For example, the signal processing control portion 6 controls setting and changing amplitude of an amplifier which the analogue signal processing portion 12 includes, setting and changing upper limit and lower limit reference voltage of the A/D converting portion 13, correction and designation of format to the digital signal processing portion 14, and command to output the signal to the communication I/F portion 15. The memory portion 5 includes nonvolatile memory, or the like, for memorizing an executable program for the signal processing control portion 6, and value of amplitude and upper limit and lower limit reference voltage used at each signal processing. The amplitude and upper limit and lower limit reference voltage serve as measurement reference values explained hereinafter. The memory portion 5 is not necessarily constructed with a single nonvolatile memory, and for example, the executable program may be memorized in an un-rewritable ROM, a work area used for the digital signal processing may be provided at a volatile RAM, and values of amplitude and upper limit and lower limit reference voltage values may be memorized in a rewritable flash memory.

Construction relates to the ECU 1 will be explained as follows. The ECU 1 receives load data outputted from the sensor 2 via the communication I/F portion 7 serving as the communication control portion. The communication I/F portion 7 has a role to output control command, or the like, to the signal processing control portion 6 via the communication I/F portion 15 of the sensor 2. Bilateral communication is conducted between the communication I/F 15 of the sensor 2 and the communication I/F portion 7 serving as the communication control portion, and with this bilateral communication, communication speed can be varied. The communication I/F portion 7 includes a reliability judging portion 16 for checking reliability of communication signal at the bilateral communication, for example, by verifying a code added at the communication I/F portion 15 of the sensor 2 in order to judge the communication error.

Because four sensors 21-24 are provided as the sensor 2 according to the embodiment of the present invention, the ECU 1 receives four load data. The ECU 1 calculates total load data by conducting the calculation such as addition and bias correction at the calculation portion 10 relative to the received load data. A state of an occupant on the vehicle seat 20 is detected at the judging portion 11 on the basis of the total load data. Here, the detection of the state of the occupant, for example, includes that a seat is unoccupied, that an adult occupies a seat, and that a child occupies a seat, or the like (i.e., classification of the occupant).

The detection result of the judging portion 11 is transmitted to other control devices in the vehicle via the communication I/F portion 7. Other control devices in the vehicle, for example, includes a retractor of a seatbelt, an ECU for controlling an airbag, or the like. As shown in FIG. 2, according to the embodiment of the present invention, the detected state (i.e., classification) of the occupant on the vehicle seat 20 is transmitted to an airbag ECU 30. On the basis of the detection result at collision, the airbag ECU 30 controls an airbag, for example, so as not to be deployed when a seat is unoccupied, to be maximally deployed when an adult occupies a seat, and to be either restrained deploying or stopped deploying when a child occupies a seat, or the like.

The ECU 1 is configured to be connected to an inspection machine 40 via the communication I/F portion 7. The inspection machine 40 is connected to the ECU 1, for example, at dealers and repair shops for examination or calibration (adjustment) of the sensor 2. A program for executing the examination and calibration is not necessarily boarded on the inspection machine 40, and may be stored in a memory means of the sensor 2 and the ECU 1. The inspection machine 40 may be configured to provide start command so that the ECU 1 and the sensor 2 execute the programs, and to indicate or memorize, or the like, of the detection result.

As explained above, the occupant classifying device for the vehicle including the load detection device for detecting load applied on the vehicle seat and for judging a classification of an occupant on the basis of the load data inputted from the load detection device includes the communication I/F portion 7 provided at the EUC 1 and serving as the communication control portion for controlling the bilateral communication between the ECU 1 and the sensor 2 serving as the load detection device. The bilateral communication is conducted at different communication speed on the basis of a operational state of the ECU 1 or the communications state of the bilateral communication. The ECU 1 serving as the control device includes the reliability judging portion 16 for judging the reliability of the bilateral communication for controlling the communication speed on the basis of the judged reliability.

Figure 3:
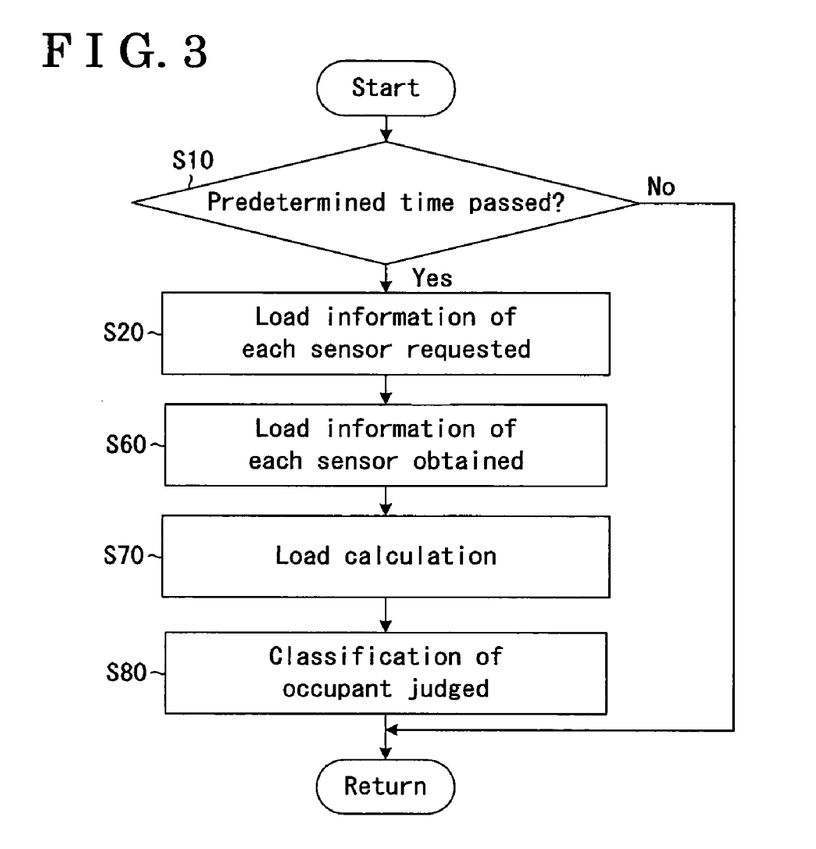
FIG. 3 is a flowchart for explaining standard operation of an ECU shown in FIG. 2.

Overall operation of the occupant classifying device for the vehicle according to the embodiment of the present invention will be explained as follows. First, a standard operation which does not include a control for bilateral communication at different communication speed will be explained on the basis of the communication state of the bilateral communication or the operational state of the ECU 1. As shown in FIG. 3, the ECU 1 requests (i.e., S20) the sensor 2 to obtain load information (i.e., load data) every predetermined time (i.e., S10). When the load information is obtained (i.e., S60) from the sensor 2 (i.e., sensors 21-24), load calculation is conducted at the calculation portion 10 (i.e., S70), and the classification of the occupant seated on the vehicle seat 20 is judged (i.e., S80).

Figure 4:
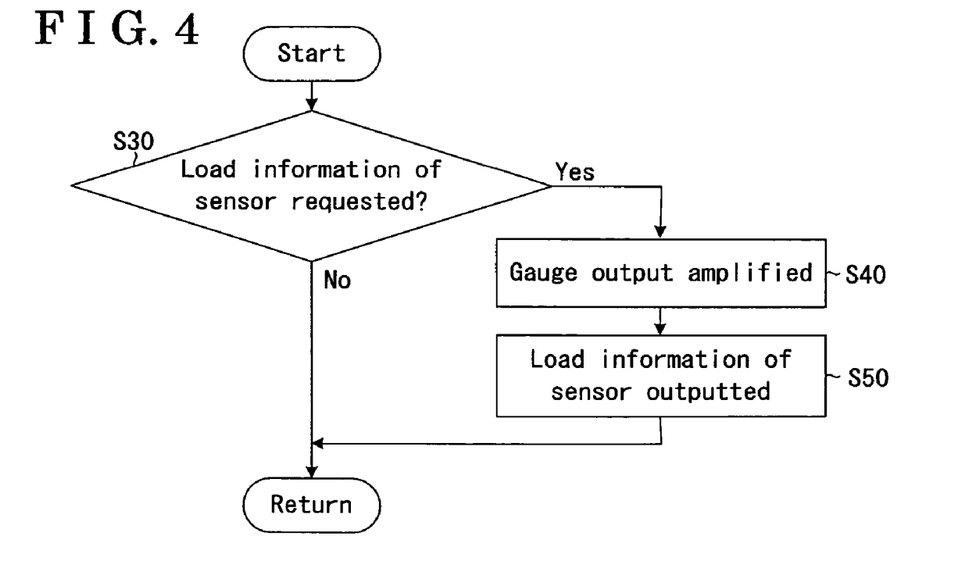
FIG. 4 is a flowchart for explaining standard operation of a sensor shown in FIG. 2.

Standard operation of the sensor 2 will be explained as follows. As shown in FIG. 4, the sensor 2 judges whether load information of sensor is requested (i.e., S30) in response to the request of the load information of the sensor of the ECU 1 (i.e., S20). When the load information of the sensor is not requested, the transaction is completed, and the transaction at Step 30 is repeated until the load information of the sensor is requested. A request of the load information of the sensor from the ECU 1 may be controlled to be received as an interruption. When the load information of the sensor is requested at Step 30, signal processing such as amplifying an output of the gauge 3 is activated relative to the signal processing portion 4 (i.e., S40), and the load information of the sensor is outputted via the communication I/F portion 15 of the sensor 2 (i.e., S50). Although the signal processing is activated by means of the signal processing portion 4 in each case for the explanatory purpose in the foregoing explanations, most updated signal at that timing may be outputted at S40 by steadily operating an electronic circuit. The load information of the sensor outputted from the sensor 2 in the foregoing manner is obtained at the ECU 1 (i.e., S60 of FIG. 3).

A construction and operation for switching the communication speed will be explained with reference to FIGS. 5-6. A first example of switching operation of the communication speed will be explained as follows. Here, a case where the ECU 1 serving as the control device controls the communication speed on the basis of the reliability judged at the reliability judging portion 16 for judging the reliability of the bilateral communication will be explained.

Figure 5:
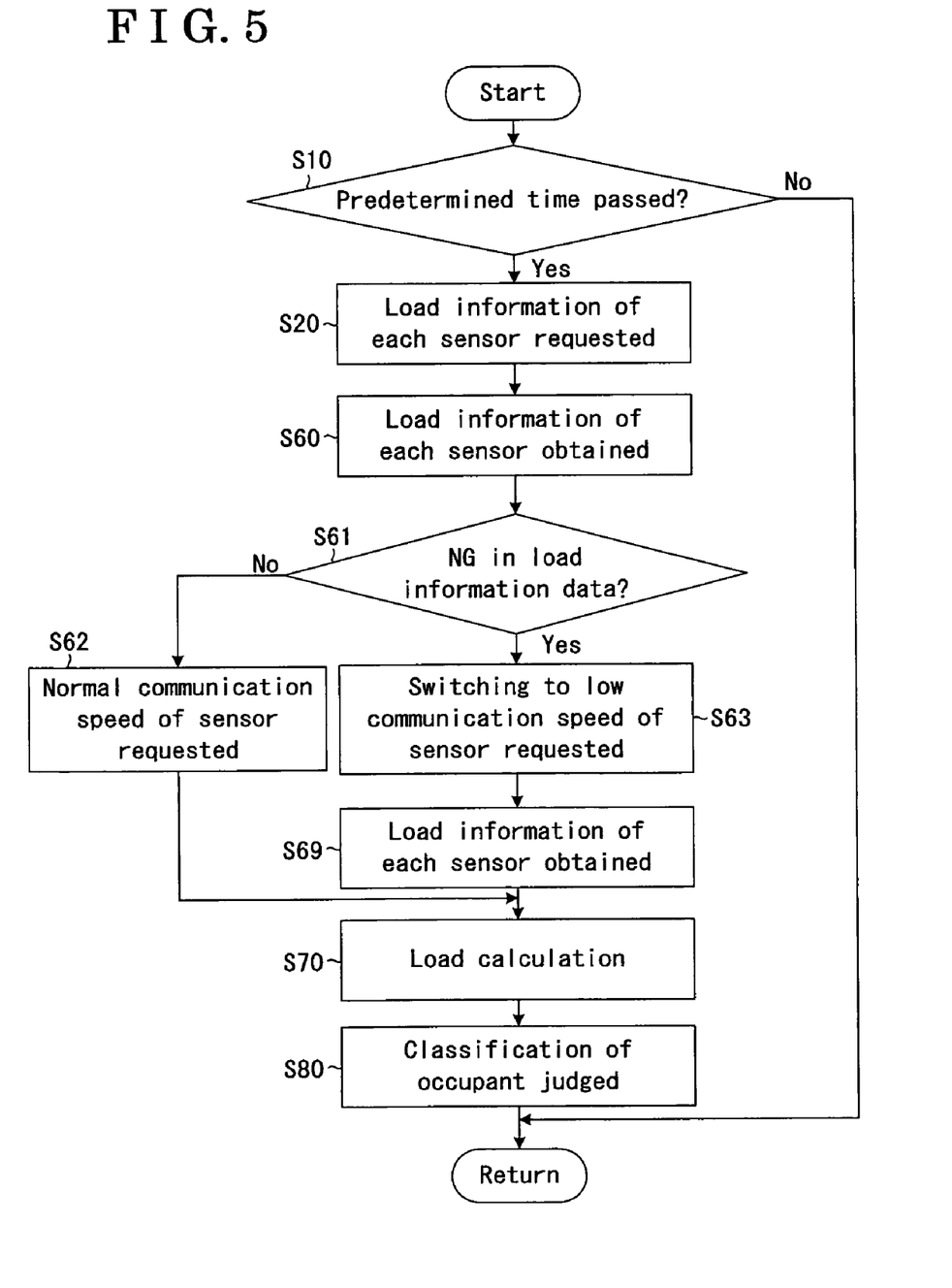
FIG. 5 is a flowchart for explaining a communication speed switching operation by means of the ECU shown in FIG. 2.
Figure 6:
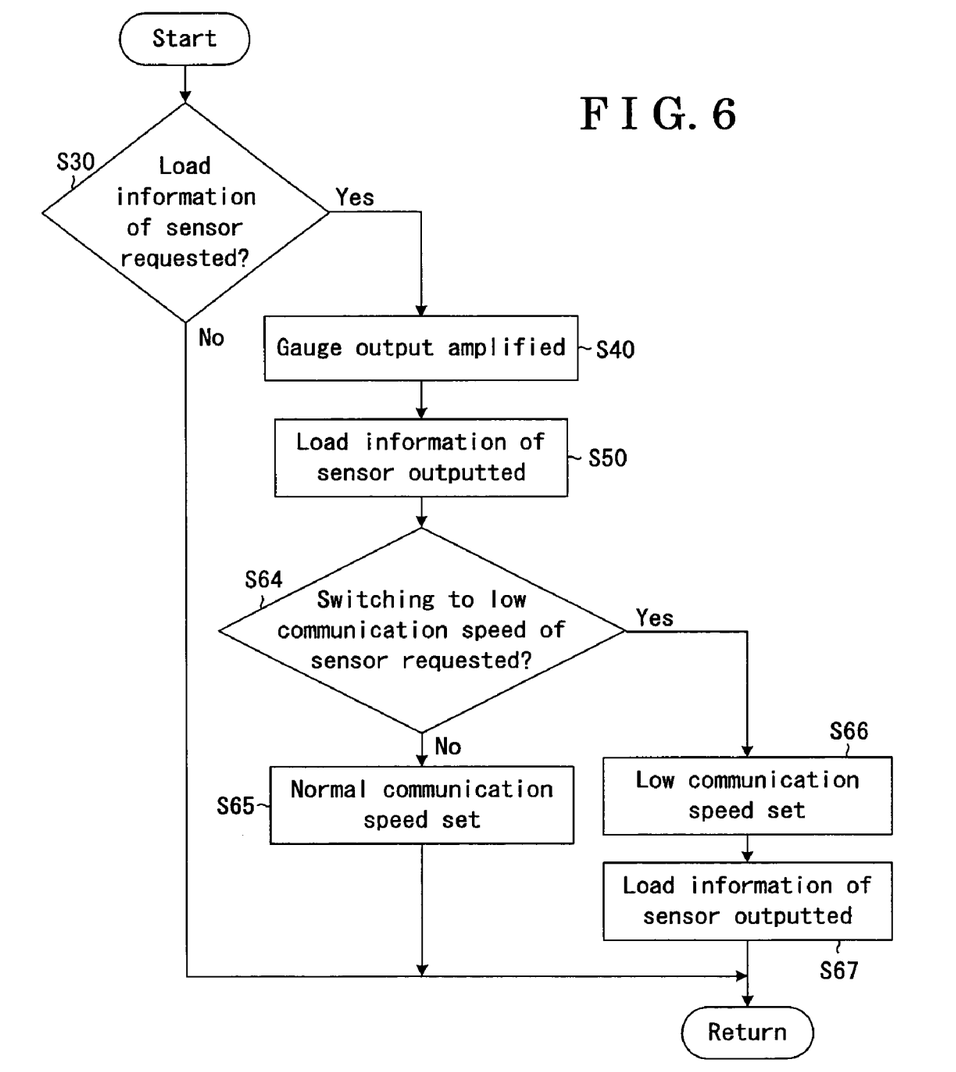
FIG. 6 is a flowchart for explaining a communication speed switching operation of the sensor shown in FIG. 2.

As shown in FIG. 5, the ECU 1 requests for obtaining the load information (i.e., load data) relative to the sensor 2 (i.e., S20) every predetermined time (i.e., S10). The communication speed up to the transaction at S20 is a standard speed, which is refereed as normal communication speed hereinafter. When the load information is obtained from the sensor 2 (i.e., sensors 21-24) (i.e., S60), whether there is an error in the data of obtained load information is checked at the reliability judging portion 16 (i.e., S61). This check may be conduced by checking a code that the sensor 2 added to the load information at the signal processing portion 4 (e.g., parity code or checksum). When it is judged that there is no error in the load information at S61, the ECU 1 requests the sensor 2 to have the normal communication speed (i.e., S62). Although there is no substantial change because the communication is conducted at the normal communication speed before the transaction at S62 with the embodiment of the present invention, for example, in a case that the communication is conducted at low speed at the previous transaction and that state is continued, the communication speed is returned to an original normal communication speed at S62. When there is no error in the communication, likewise the standard operation, the load calculation is conducted at the calculation portion 10 (i.e., S70), and the classification of the occupant on the vehicle seat 20 is judged (i.e., S80).

In a case where it is judged that there is an error in the communication, the ECU 1 requests to change the communication speed of the sensor 2 to a low speed (i.e., S63). The error may be judged on the basis of ratio of errors included in the load information, or the like, received within a predetermined time, or when there are predetermined numbers of consecutive errors in the load information, or the like. After the communication speed is switched to the low speed, load information of each sensor is re-obtained (i.e., S69), the load is calculated at the calculation portion 10 (i.e., S70), and the classification of the occupant on the vehicle seat 20 is judged (i.e., S80).

An operation of each sensor 21-24 (i.e., represented as the sensor 2) will be explained as follows. As shown in FIG. 6, first, it is checked whether load information of a sensor is requested (i.e., S30). When the load information of the sensor is requested, the sensor 2 conducts standard operation as normal operation. That is, transactions shown as S40, S50 are carried out. When the load information of the sensor is not requested, the transaction is completed, and the transaction at S30 is repeated until a request for the sensor load information arises. In a case where it is judged that there is an error in the load information at transaction S60 of the ECU 1 after outputting the load information at S50, a request for switching the communication speed of the sensor 2 to a low speed is outputted from the ECU 1 (i.e., S63 of FIG. 5). The sensor 2 judges whether switching of the communication speed of the sensor 2 to the low speed is requested at S63 (i.e., S64), and the communication speed is reset to the normal communication speed in case there is no request of S63 (i.e., S65) to complete the transaction. In a case where switching operation of the communication speed of the sensor 2 to the low speed is requested, in this case, the communication speed is set at the low communication speed (i.e., S66), load information is re-outputted (i.e., S67), and the transaction is completed. Accordingly, the ECU 1 serving as the control device switches the communication speed to the low speed on the basis of the reliability judged at the reliability judging portion 16 for judging the reliability of the bilateral communication.

Although the sensors 21-24 serving as the plural load detection devices are represented as the sensor 2, communication speed may be controlled differently for each sensor 21-24 because the ECU 1 serving as the control device includes the communication I/F portion 7 which enable the bilateral communication for each sensor 21-24.

A second example of switching operation of the communication speed will be explained as follows. As shown in FIG. 2, the ECU 1 serving as the control device is configured to be connected to the inspection machine 40 serving as an inspection device for performing calibration such as adjusting and examining the sensor 2 serving as the load detection device. In case programs in the sensor 2 and the ECU 1 is executed by means of a command from the inspection machine 40 to operate by a calibration operation mode which is an operational state where calibration such as examination and adjustment, or the like, is conducted, the ECU 1 controls the communication speed on the basis of the command of the calibration operation mode activation from the inspection machine 40. A communication speed control under a condition that the inspection machine 40 is connected to the ECU 1 and the ECU 1 operates at the calibration operation mode will be explained as follows. According to the embodiment of the present invention, as calibration operation is explained with reference to as it called an operation for zero point reset where zero point reference of the sensor 2 is matched on the basis of the load information when the vehicle seat 20 is unoccupied.

Figure 7:
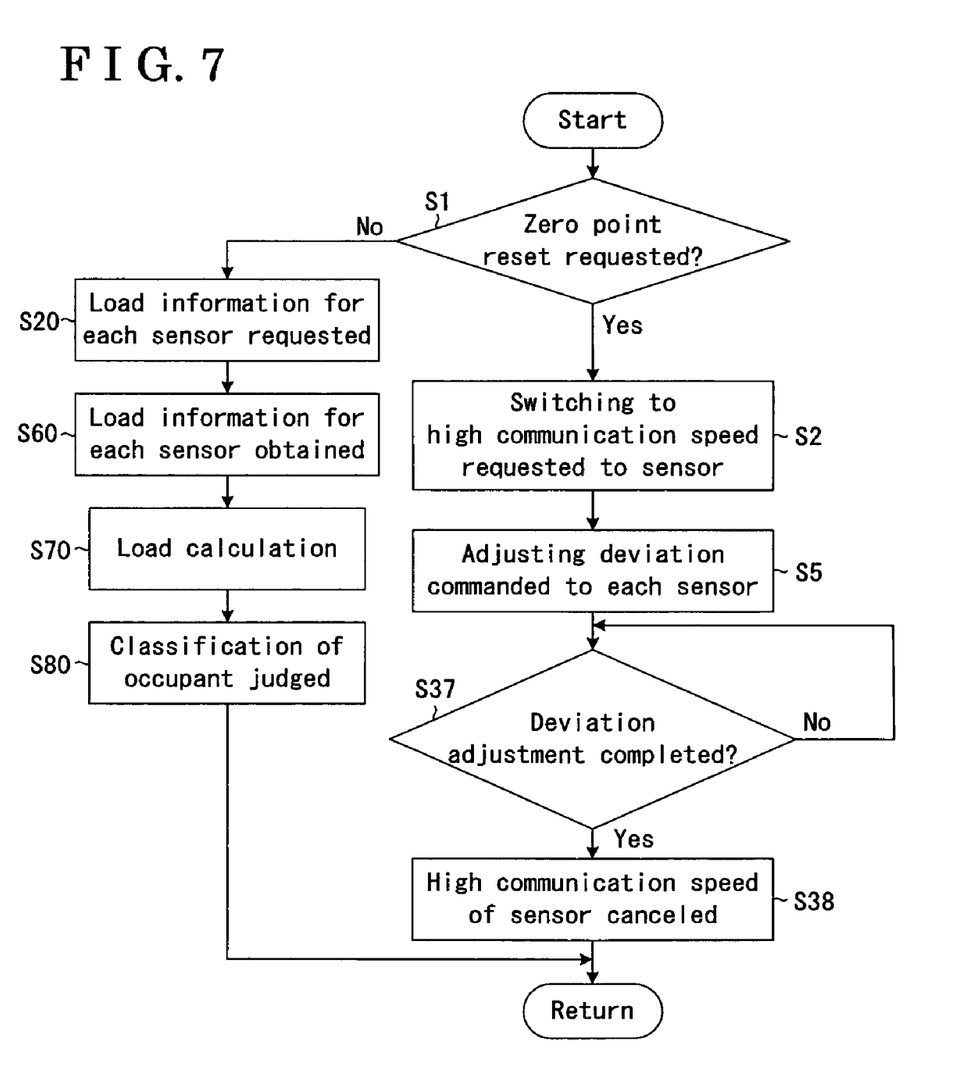
FIG. 7 is a flowchart for explaining a communication speed switching operation by calibration operation mode of the ECU shown in FIG. 2.

As shown in FIG. 7, the ECU 1 checks whether zero point reset is requested, that is, whether a request for adjusting zero point reference (i.e., S1) is conducted. In a case where no zero point reset is requested at S1, the ECU 1 conducts a standard operation as normal operation. In other words, likewise the operation explained in FIG. 3, transactions in S20, S60, S70, and S80 are carried out in order for judging the classification of the occupant on the vehicle seat 20. When the foregoing operation is conducted only for the examination, as shown in FIG. 7, the classification of the occupant on the vehicle seat 20 may be judged without confirming elapse of a predetermined time (i.e., skipping the transaction at S10). When the zero point reset is requested at S1, a request for switching the communication speed to high communication speed is outputted to the sensor 2 (i.e., S2). Thereafter, a command to adjust a deviation relative to zero point is outputted to each of the sensors 21-24 (i.e., S5). When completion of a deviation adjustment processing, in other words, when it is confirmed that the zero point reset processing is completed in this case (i.e., S37), a request for canceling the high communication speed to be normal communication speed is outputted (i.e., S38), and the transaction is completed.

Although the request for the zero point reset is inputted from the inspection machine 40 connected to the ECU 1 when examining the vehicle, or the like, according to the embodiment of the present invention, the zero point reset may be requested by a result of self-diagnosis program, or the like, executed by the ECU 1. The self-diagnosis program can be executed by recognizing that the load is not applied on an objective vehicle seat 20, or the like, on the basis of that the vehicle is stopped, the occupant got off the vehicle, and a door is locked, or the like in cooperation with other systems in the vehicle.

Figure 8:
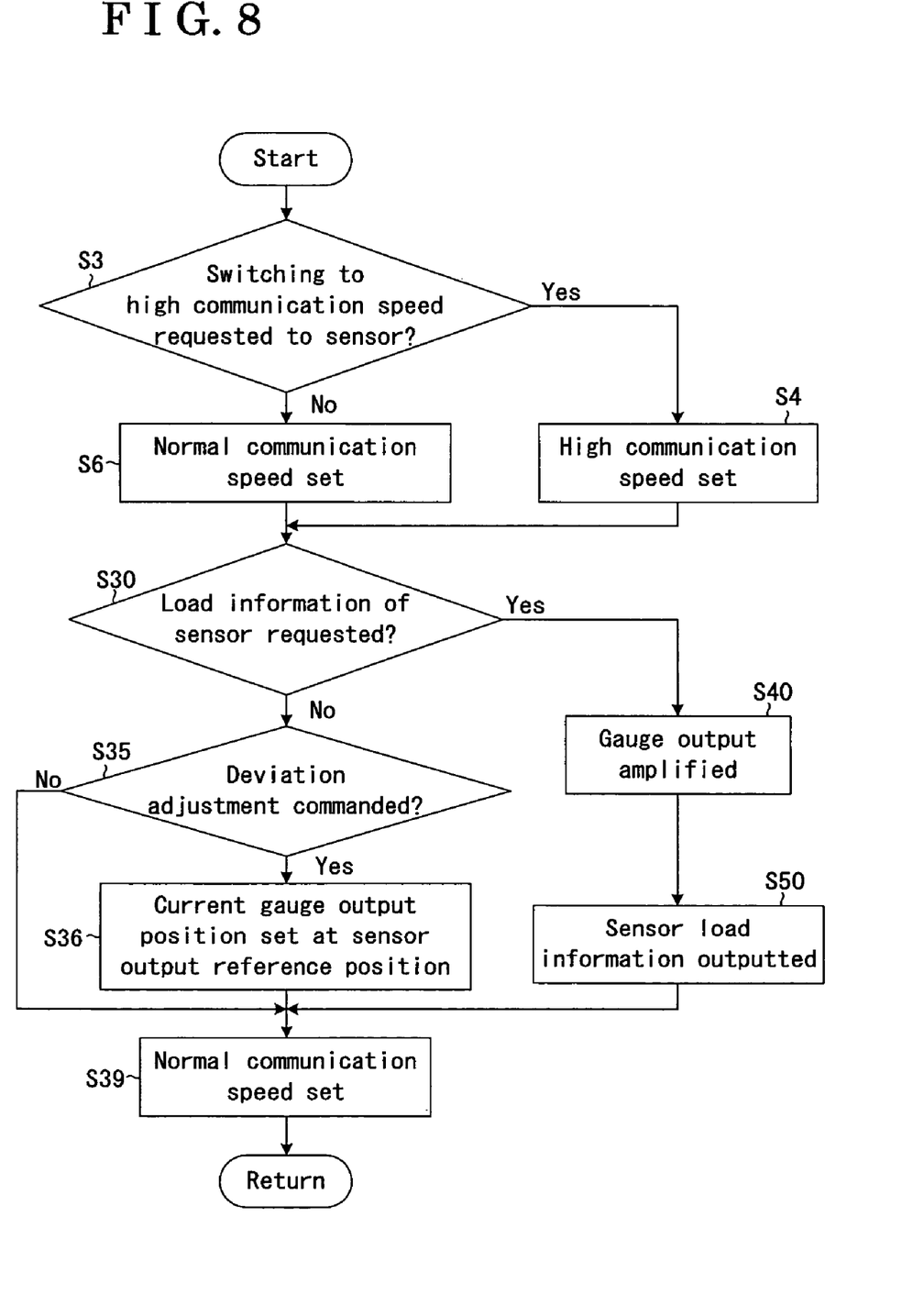
FIG. 8 is a flowchart for explaining a communication speed switching operation by calibration operation mode of the sensor shown in FIG. 2.

Operation of each of the sensors 21-24 (i.e., represented as the sensor 2) will be explained as follows. As shown in FIG. 8, first, whether switching sensor speed is request is checked, in this case, whether there is a request for switching the communication speed to high communication speed is checked (i.e., S3). In a case there is no switching request, the communication speed is reset at the normal communication speed (i.e., S6), and in a case there is a switching request, the communication speed is set at high communication speed (i.e., S4). Thereafter, whether the load information of sensor is requested is checked (i.e., S30). In a case where load information of a sensor is requested, likewise at the normal operation, the sensor execute the transactions S40 and S50 explained with reference to FIG. 4. In a case there is no request for sensor load information, whether a command for adjusting the deviation is outputted from the ECU 1 is checked (i.e., S35). In case a deviation adjustment command is outputted, current output position of the gauge 3 is set at an output reference position of the sensor 2 (i.e., S36). The foregoing operation is conducted for zero point adjustment where the vehicle seat 20 is unoccupied. Thus, by setting the output of the gauge 3 at that timing at the output reference position of the zero point of the sensor 2, zero point adjustment can be achieved. Upon the completion of the zero point adjustment, the sensor 2 announces the completion of the adjustment processing to the ECU 1, the ECU 1 judges the completion of the adjustment processing on the basis of the announcement, and the ECU 1 outputs a request to cancel the high communication speed and to switch to the normal communication speed relative to the sensor 2 (i.e., S37-S38 of FIG. 7). The sensor 2 which received the request reset the communication speed at the normal communication speed (i.e., S39), and complete the processing.

The zero point reset can be achieved, for example, by setting and changing a virtual ground level which serves as a starting point of amplification and amplitude of amplifier of the analogue signal processing portion 12, and upper limit and lower limit reference voltage, or the like, of the A/D converting portion 13. For example, the A/D converting portion 13 converts analogue input voltage between the lower limit reference voltage and upper limit reference voltage into digital data by a predetermined resolution. Thus, by setting the lower limit reference voltage at the input voltage to the A/D converting portion 13 when the vehicle seat 20 is unoccupied (i.e., the output of the gauge 3 after the amplification at the analogue signal processing portion 12), zero point reset is achieved. Although detailed explanation is omitted for other method, the calibration of the senor 2 can be achieved by changing a set value of the signal processing portion 4 and by re-memorizing the changed set value at the memory portion 5.

Although switching operation between the normal communication speed and the low communication speed, and switching operation between the normal communication speed and the high communication speed are explained separately with the foregoing explanations, the normal communication speed, low communication speed, and high communication speed can be programmed to be switched one another. For example, switching operation among the normal communication speed, low communication speed, and high communication speed may be switched not only on the basis of communication state, but also on the basis of operational state of the ECU 1. That is, the communication speed may be controlled in accordance with operational state of the ECU 1 serving as the control device including at least calibration operation for examining or adjusting the sensor 2 serving as the load detection device, safety operation operated along a safety device such as an airbag, and normal operation.

A third example of switching operation of the communication speed will be explained as follows. With the calibration operational state, the communication speed is controlled so that the communication is conducted at high communication speed as explained at a second switching example of the communication speed. Because the calibration operation is conducted at manufacturing plants or repair shops for dealers in many occasions, and countermeasure against noise, or the like, is sufficiently provided in those environment, productivity can be improved by conducting the communication at high communication speed at an operational state such as assembling adjustment.

The safety operational state which cooperates with the safety device such as airbag, for example, includes a case to detect a classification of an occupant seated on the vehicle seat 20 in order to determine the degree of the deployment of the airbag, or the like, by predicting collision. With the safety operational state as shown above, it is preferable to communicate at the low speed prioritizing secure transmission. In this case, the low communication speed at the safe operation is not necessarily as low speed as providing significant impact on operational time of the safety device of the vehicle, and because the communication speed is acceptable as long as the speed is set at a degree with which successful communication is increased considering the noise-proof, or the like, there is not problem with low speed communication.

At the normal operational state, the communication is conducted at the normal communication speed. In a case where the reliability judging portion 16 judges that the reliability of the communication is declined because of the influence of the noise, or the like, at the normal communication speed, the communication speed is switched to the low communication speed.

Figure 9:
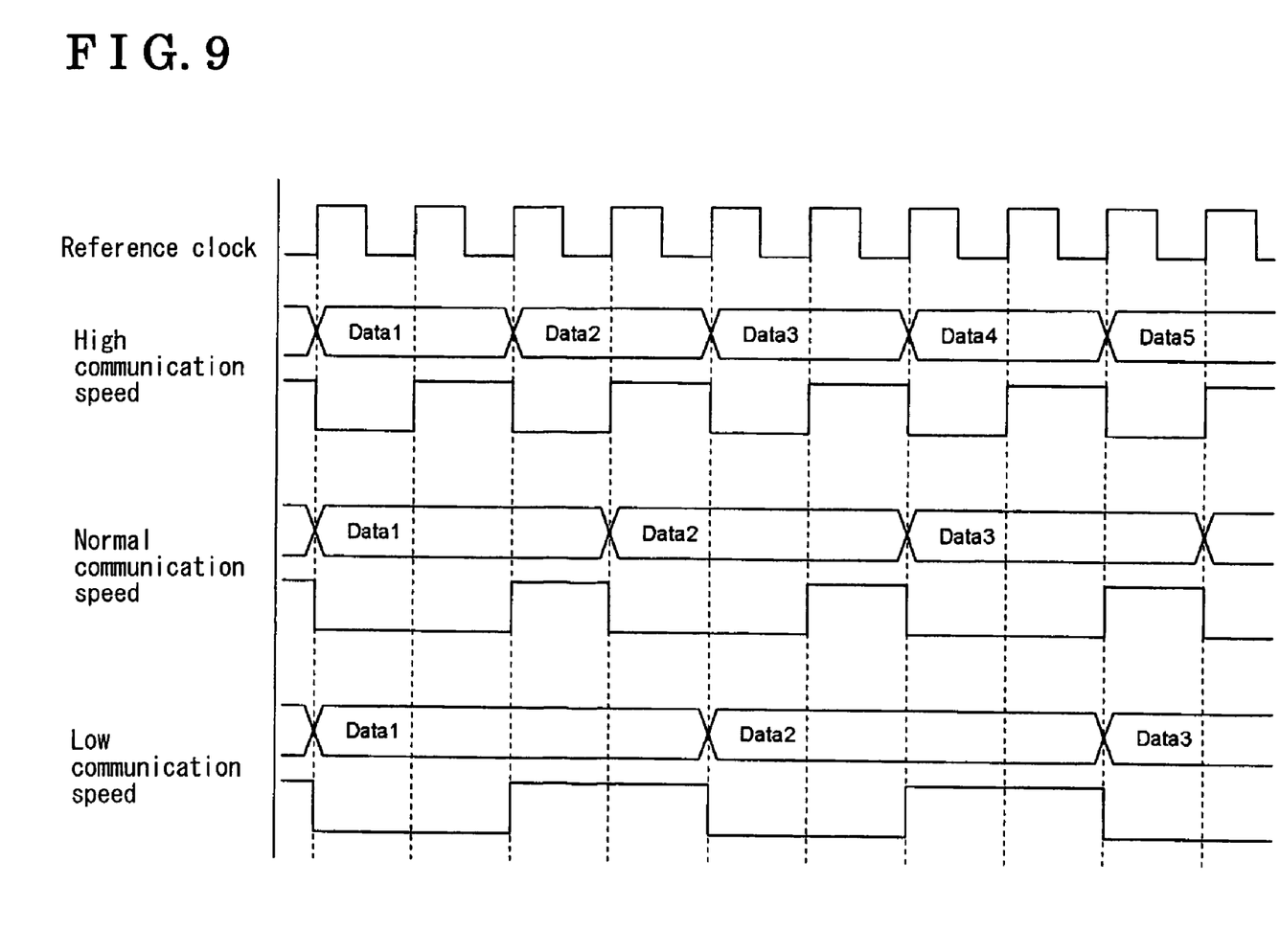
FIG. 9 is a view showing examples of communication speed of the occupant-classifying device for the vehicle according to the embodiment of the present invention.

A reference clock shown in FIG. 9 is a reference clock for driving the sensor 2 and the ECU 1. The communication I/F portion 7 of the ECU 1 and the communication I/F portion 15 of the sensor 2 are controlled on the basis of the reference clock. Numerical information such as load data and command information such as execution command is generated and formed as electric signal on the basis of the reference clock. For example, at the normal communication speed, a single datum is outputted having three cycles of the reference clock as a reference. At the high communication speed, a single datum is outputted having two cycles of the reference clock as a reference. At the low communication speed, a single datum is outputted having four cycles of the reference clock as a reference. In this case, pulse waves shown at a bottom of the data may be used as a control clock for bilateral communication. Although communication speed is varied using two-four cycles of the reference clock according to the foregoing explanations of the embodiment of the present invention, other ratio of cycles, for example, one-three cycles can be applied.

In case the signal processing portion 4 of the sensor 2 and the ECU 1 is constructed with a microcomputer, or the like, communication control function included in the microcomputer may be used. In this case, the selectable communication speed of the communication control function provided in the microcomputer, for example, 9600 bps (bit per second), 12800 bps, 15000 bps, or the like, may be applied to the low communication speed, normal communications peed, and high communication speed respectively.

According to the embodiment of the present invention, the occupant classifying device which transmits accurate load data with improved noise-proof can be provided.

According to the embodiment of the present invention, because the control device includes the communication control portion for controlling bilateral communication between the load detection device and the control device for conducting the bilateral communication at different communication speeds in accordance with the communication state and the operational state, the communication adapted to the communication state and the operational state can be established. For example, when the communication state is not favorable, more accurate communication can be conducted by establishing the communication at low speed. Further, because the countermeasure for the noise is sufficiently provided at plants, the productivity can be improved by conducting communication with high speed at the operational state such as assembling adjustment.

According to the embodiment of the present invention, because the control device includes the reliability judging portion, and the communication speed is controlled on the basis of the reliability judged at the reliability judging potion, the communication which is more securely adapted to the communication state can be established.

According to the embodiment of the present invention, because the communication speed is controlled in accordance with the operational states of the control device including at least the calibration operation, safety operation, and normal operation, the communication speed agreed with each operational state can be favorably determined. As a result, the communication speed agreed with the operational state can be determined, for example, the communication is established at low speed prioritizing the security of the transmission at the safety operation, and the communication is established at high speed considering the productivity at the calibration operation. In this case, the low communication speed at the safe operation is not necessarily as low speed as providing significant impact on operational time of the safety device of the vehicle, and because the communication speed is acceptable as long as the speed is set at a degree with which successful communication is increased considering the noise-proof, or the like, there is not problem with low speed communication.

According to the embodiment of the present invention, because the plural load detection devices are provided under the vehicle seat and the communication speed can be controlled for each load detection device when detecting the classification of the occupant on the vehicle seat by calculating each load data obtained from the plural load detection device, the communication speed is not influenced by a single load detection device which is not in good communication state. For example, in a case where the control device is programmed to collect the load data periodically from the load detection device by conducting the communication periodically, the control device can be set at power saving function state where the power consumption of the load detection device and the control device is restrained when the load data is not collected. At the low speed communication, the power consumption state is shortened because time activated for each communication is long. Hoverer, with the construction according to the embodiment of the present invention, the communication speed with the plural load detection devices can be set for each load detection device, the power saving function does not influence the other load detection devices, which is favorable.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An occupant classifying device for a vehicle, comprising: a load detection device for detecting a load applied on a vehicle seat; a control device for judging classification of an occupant on the basis of load data inputted from the load detection device; and a communication control portion provided on the control device, the communication control portion for controlling bilateral communication conducted between the load detection device and the control device; wherein the bilateral communication is conducted at different communication speeds on the basis of a communication state of the bilateral communication or an operational state of the control device, and wherein the load detection device includes plural load detection devices, and the control device controls the communication speed for each of the load detection devices.

2. The occupant classifying device for the vehicle according to claim 1, further comprising a reliability judging portion provided at the control device for judging reliability of the bilateral communication; wherein the communication speed is controlled on the basis of reliability judged at the reliability judging portion.

3. The occupant classifying device for the vehicle according to claim 2, wherein the control device controls the bilateral communication to be slower when the reliability judging portion judges that reliability is low compared to a case where the reliability judging portion judges that reliability is high.

4. The occupant classifying device for the vehicle according to claim 2, wherein the reliability judging portion judges level of the reliability by checking a code added to the load data inputted from the load detection device.

5. The occupant classifying device for the vehicle according to claim 3, wherein the reliability judging portion judges level of the reliability by checking a code added to the load data inputted from the load detection device.

6. An occupant classifying device for a vehicle, comprising:
- a load detection device for detecting a load app lied on a vehicle seat;
- a control device for judging classification of an occupant on the basis of load data inputted from the load detection device; and
- a communication control portion provided on the control device for controlling bilateral communication conducted between the load detection device and the control device,
- wherein the bilateral communication is conducted at different communication speeds on the basis of a communication state of the bilateral communication or an operational state of the control device, and
- wherein the control device is programmed to have at least a calibration operation for examining and adjusting the load detection device, a safety operation cooperating with a safety device, and normal operation, and the control device controls the communication speed in accordance with each of the operations.

7. The occupant classifying device for the vehicle according to claim 6, wherein the control device controls the communication speed of the bilateral communication to be higher at the calibration operation than at the normal operation.

8. The occupant classifying device for the vehicle according to claim 7, wherein the control device controls the communication speed of the bilateral communication to be lower at the safety operation than at the normal operation.

9. The occupant classifying device for the vehicle according to claim 8, wherein the load detection devices includes plural load detection devices, and the control device controls the communication speed for each of the load detection devices.

10. The occupant classifying device for the vehicle according to claim 7, wherein the load detection devices includes plural load detection devices, and the control device controls the communication speed for each of the load detection devices.

11. The occupant classifying device for the vehicle according to claim 6, wherein the control device controls the communication speed of the bilateral communication to be lower at the safety operation than at the normal operation.

12. The occupant classifying device for the vehicle according to claim 11, wherein the load detection devices includes plural load detection devices, and the control device controls the communication speed for each of the load detection devices.

13. The occupant classifying device for the vehicle according to claim 6, wherein the load detection devices includes plural load detection devices, and the control device controls the communication speed for each of the load detection devices.

* * * * *

UNITED STATES PATENT AND TRADEMARK OFFICE
CERTIFICATE OF CORRECTION

| | | |
|---|---|---|
| PATENT NO. | : 7,613,550 B2 | Page 1 of 1 |
| APPLICATION NO. | : 11/165486 | |
| DATED | : November 3, 2009 | |
| INVENTOR(S) | : Sakai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1167 days.

Signed and Sealed this

Nineteenth Day of October, 2010

David J. Kappos
*Director of the United States Patent and Trademark Office*